(No Model.)
J. A. LANNERT.
WATCHMAN'S TIME RECORDER.
No. 455,440. Patented July 7, 1891.
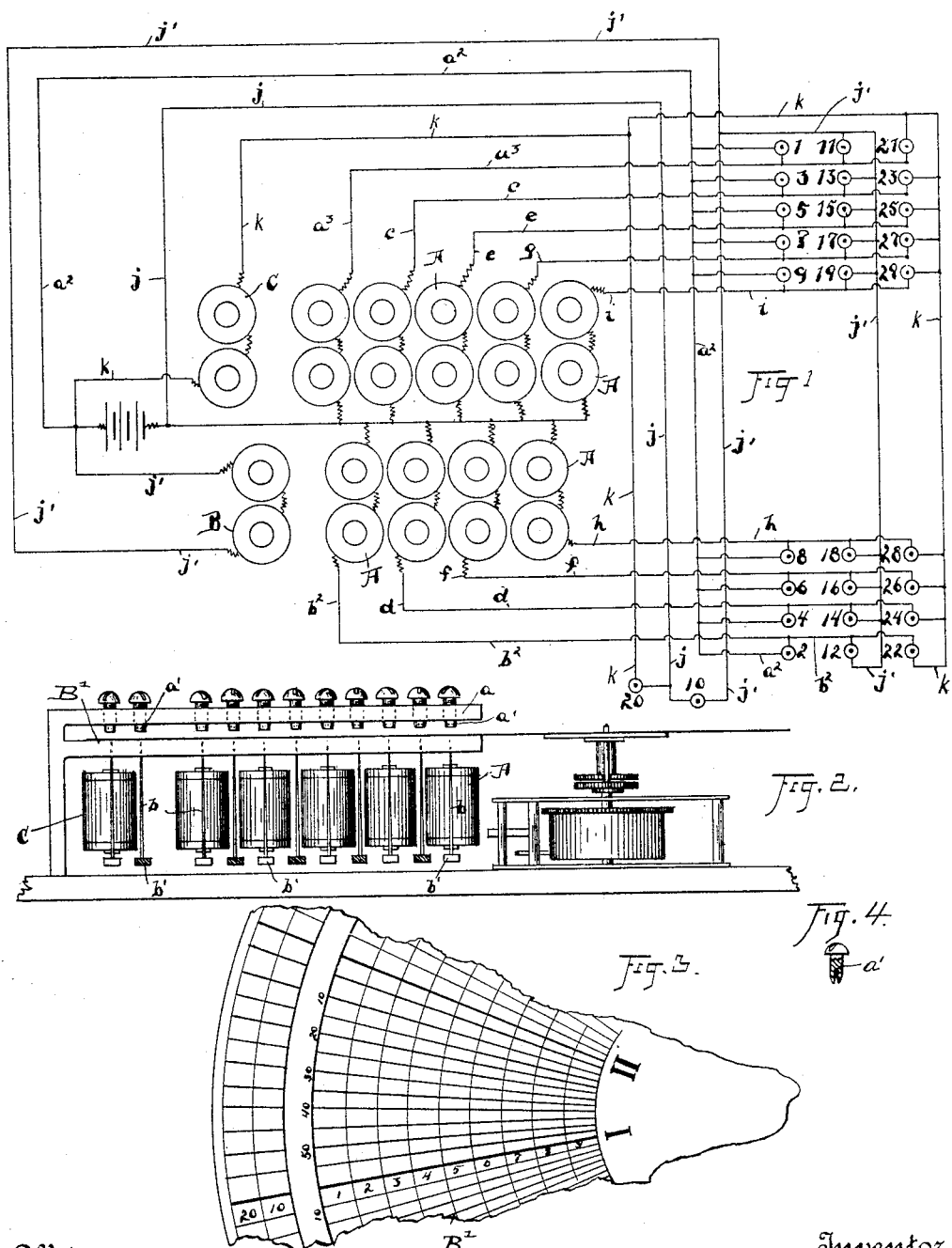
Witnesses
R. B. Moser
Victor Schneider
Inventor
John A. Lannert
By his Attorney
H. T. Fisher.

UNITED STATES PATENT OFFICE.

JOHN A. LANNERT, OF CLEVELAND, OHIO.

WATCHMAN'S TIME-RECORDER.

SPECIFICATION forming part of Letters Patent No. 455,440, dated July 7, 1891.

Application filed January 5, 1891. Serial No. 376,766. (No model.)

*To all whom it may concern:*

Be it known that I, JOHN A. LANNERT, a citizen of the United States, residing at Cleveland, in the county of Cuyahoga and State of Ohio, have invented certain new and useful Improvements in Watchmen's Time-Recorders; and I do hereby declare that the following is a full, clear, and exact description of the invention, which will enable others skilled in the art to which it appertains to make and use the same.

My invention relates to improvements in watchmen's time-recorders; and it consists of the features set forth in the following description which embodies a duplex recording mechanism which acts upon a dial of the recorder, having radial lines thereon, which by their divisions represent time and are arbitrarily divided into twelve main divisions representing the hours from 1 to 12, while each one of these main divisions is divided into twelve divisions of five minutes each. The stations themselves are represented by concentric divisions lying contiguous to each other in concentric circles around the axis of the dial. The two outer concentric divisions serve for the recording of the tens of the numbers representing the stations, while the inner divisions, numbered from 1 to 9, record the units of any station numbered. Thus when it is desired to record an impulse from station 1 the record is made in concentric division 1, and if a record is to be made for station 7 or 9 the record is made in a division representing these stations, while if it is desired to record an impulse from station 11 then a record is made in divisions numbered 1 and 10, or if for station 10 division 10 is used. In the case of a record being made for station 18 or 19, the needle of the tens-recording magnets records in the 10 division and the units-needle in the 8 or the 9, as the case may be, thus combining two of the concentric divisions for the recording of stations bearing numbers 11 to 19, inclusive, hence making a duplex record, in that when these stations are recorded there is always a record made in the units-division and one in the tens-division, the two being taken together in conjunction when the record is read. I effect this manner of recording by combining certain electro-magnets in the same circuit for certain stations, and hence make the impulse from one station if the station is represented by any of the numbers between 10 and 20 by causing the impulse to actuate two electro-magnets placed in the same circuit for the time being, while if only a units record is to be made the impulse actuates only a single magnet.

To more clearly understand the device, there is shown in Figure 2 a portion of the dial in its relation to the recording-magnets, and in Fig. 1 is also shown the diagrammatic relation as between the stations and recording-magnets of the system. It will be noticed that the recording-magnets are placed adjacent to each other, and that they actuate through their armature a needle-recorder, which punctures the dial the moment the impulse from any of the stations is sent through the magnets. This detail of construction is well known and of ordinary arrangement of parts. The novel feature, however, in my system is embodied in providing means whereby eleven electro-magnets serve the purpose of twenty magnets as ordinarily used, thus being an appreciable saving both in the number of magnets as well as in the circuits running to the stations. The units-magnets A, running from 1 to 9, as well as the magnets B C for recording stations 10 and 20, have distinct lines leading to those stations from the magnets, of course one common battery return-wire answering for all of the units-magnets. Now, when it is desired to connect a tens-station so as to be enabled to make the record upon the dial—as, for instance, in the case of station 11—its terminals will be connected as follows: One of the terminals will connect with the home wire of station 1 and the other with the home wire of station 10, and in the case of station 15, for instance, only one terminal will connect with the home wire of station 10 and the other with the home wire of station 5, &c., any of the stations between 10 and 20 having their one terminal invariably connected to the home wire of station 10 in order to register the tens, while the other terminal will connect with the home wire of whatever the units of the station's number is. In this instance it will be seen that the dial is simply rotated and the recording-needle of the magnets has a uniform rotation of movement. By combining more than one set of magnets in one circuit at a time I make a duplex record, which will represent the number of a different station than if only one of the magnets were used.

In the accompanying drawings, Fig. 1 illustrates in a diagrammatic plan view the relation of circuits between the magnets of the recording device and the sending-stations. Fig. 2 is a section through the recorder, showing the relation of the dial to the recording-magnets and their needles. Fig. 3 is a plan view of the dial, showing the arrangement of divisions thereon. Fig. 4 is a detail view of one of the projections $a'$ with the lower end broken away to disclose its internal construction.

The connections can easily be traced from the accompanying drawings, wherein are represented recording-magnets A, answering for stations from 1 to 10, and magnet B serving to record from the tens-station, while magnet C serves station 20. The arrangement of parts to effect this record is substantially as shown in Fig. 2, wherein is provided a common bar $a$, having projections $a'$ from its lower side, as many of these projections being provided as there are recording-needles $b$ in the recorder. The needles $b$ are actuated at the proper time through armatures $b'$ to puncture the dial B' as it is carried between the points of the needles and the projections $a'$. The projections $a'$ have very small openings into which the needle can extend as it punctures a dial, so as to facilitate the recording functions of the apparatus.

From Fig. 1 of the drawings the relation between the recording mechanism and the different stations can readily be traced. For instance, through station 1 the battery-terminal of station 1 connects with line $a^2$, while the magnet-terminal of the same station connects with line $a^3$, while from station 3 a magnet-terminal connects with line $c$, and in station 5 by line $e$, and in station 7 by line $g$, and in station 9 by line $i$, while station 2 has its magnet-terminal connected with line $b^2$, and station 4 with line $d$, and station 6 by line $f$, and station 8 by line $h$, the battery-terminals of all these stations from 1 to 9, inclusive, being connected to line $a^2$. In the case of station 10 its battery-terminal is connected to line $j$ and its magnet-terminal to line $j'$, while stations 11 to 19, respectively, have their battery-terminals connected to line $j'$ through the tens-magnet B and their units-magnet terminals, respectively, to the same lines which connect the magnet-terminals of stations from 1 to 9, respectively, while station 20 connects to battery through line $j$ and to its magnets over line $k$. Stations from 21 to 29 are respectively connected as follows: They have connection with the battery over line $k$ through the 20 magnet C and to their respective electro-magnets from the lines leading to the units-stations from 1 to 9—viz., $a^3$ $b^2$ $c$ $d$ $e$, &c.

The device can readily be adapted to recording higher station-numbers than 29, as herein provided for, by adding another magnet for 30, one for 40, 50, 60, &c., and combining these magnets with whatever units-circuits are necessary. For 22 magnets 20 and 2 would be in circuit together, and for 55 the 50 magnet would be in connection with magnet 5, &c., the combination always being between the tens and units, as may be desired.

The foregoing description refers more particularly to the application of this invention to a watchman's time-recorder; but it can be used wherever units and tens are desired to be recorded electrically by a single closing of a circuit.

Having thus described my invention, what I claim as new, and desire to secure by Letters Patent, is—

1. In an electric recording system, a recording mechanism comprising a series of magnets to record units, a series of magnets adapted to record tens, and electric connection between them, so that the current will make one magnet of each series record, substantially as described.

2. In an electric recording system, a series of magnets adapted to record units, a magnet or magnets adapted to record tens, recording mechanism actuated by the magnets, and a central station, in combination with sending-stations connected by circuits, so that the current will make both units and tens magnets record, substantially as described.

3. In an electric recording system, a recording mechanism comprising magnets for recording units, in combination with a magnet or magnets of the recording mechanism adapted to record tens, and sending-stations in circuit therewith, so that the current will make both units and tens magnets record, substantially as described.

4. In an electric recording system, a recording mechanism in electrical connection with sending-stations, said recording mechanism being adapted to record by one set of magnets the units of any station-number and by another set to record higher numbers than units, in combination with sending-stations and circuits therefrom comprising for the stations designated by units single magnets and for stations numbered above units two or more magnets in each station-circuit, substantially as described.

5. In an electric recording system, a recording mechanism comprising magnets adapted to record less than tens and other magnets of such mechanism adapted to record more than units, in combination with means for forming such record in conjunction with each other, substantially as described.

6. In an electric recording system, a recording mechanism comprising recording-magnets adapted to record not less than tens and greater than units in conjunction with each other, said magnets being placed in different planes with respect to each other, substantially as described.

Witness my hand to the foregoing specification this 28th day of December, 1890.

JOHN A. LANNERT.

Witnesses:
H. T. FISHER,
N. L. McLANE.